Patented Oct. 6, 1942

2,297,786

UNITED STATES PATENT OFFICE 2,297,786

METHOD OF PARTIAL FREEZING OUT OF LIQUID

Erik David Lindblom, Finspong, Sweden

No Drawing. Application January 28, 1941, Serial No. 376,384. In Sweden February 1, 1940

4 Claims. (Cl. 62—124)

In connection with the concentration of solutions by a freezing operation or the accumulation of cold by a partial removal of the solvent, for instance, water, from a solution by means of a freezing operation, it is well-known to use a refrigerating machine on the cooling surfaces of which the ice deposits. In such processes it is of the utmost importance to positively free said surfaces from the ice produced, since otherwise the heat transfer would be reduced in an undue degree. In order to allow a continuous removal of the ice it is preferred to use movable devices to effect said removal. Such devices, however, require an ample space, are expensive to obtain, and are not always capable of removing the ice to the extent desired, with a resulting impairment of the heat transfer.

The present invention has for its object to provide an improved method for the concentration of solutions and the accumulation of cold by partially freezing out the solvent as well as for the production of ice while avoiding the deposit of ice on cooling surfaces, thereby making the use of scrapers and similar devices superfluous.

An essential feature of the invention resides in lowering the freezing point of a liquid or solution by adding an appropriate substance adapted to exist in the gaseous state thereto and then subjecting the liquid together with said added substance to a cooling action, by which its temperature is lowered to a point lying between the freezing point as obtained as a result of the adding of said substance and the original freezing point of the liquid. Then, the added substance is removed, thereby bringing the freezing point of the liquid back again to its original value lying above the temperature to which the liquid has been cooled. This will result in a partial freezing out of the liquid. Since there are no cooling surfaces, there will be no deposit of ice on the walls of the vessel, the formation of ice taking place within the liquid itself in the form of ice crystals.

It is preferred to use a harmless, neutral, or inert substance adapted to exist in either the gaseous, liquid, or solid state, such as air or carbon dioxide, as the substance for lowering the freezing point of the liquid. If the liquid is contained in a closed receptacle and the gas is introduced under pressure, so as to produce a pressure above atmospheric in the receptacle, more gas can be absorbed than would be the case at atmospheric pressure. This will cause a further lowering of the freezing point, thereby allowing the liquid to be further cooled without freezing.

The cooling operation having been completed, the gas is allowed to escape with a resulting rise of the freezing point of the liquid to a higher temperature and a partial freezing out of the liquid because of its previous cooling to a temperature below said higher temperature.

A contribution to the freezing out effect is afforded by the absorption of heat due to the expansion of the gas, as the receptacle is opened, as well as due to evaporation of the liquid that may take place. If the liquid is supercooled, that is to say, if it is still in the liquid state to a temperature below the freezing point because of the inertia of the molecules, the said escape of the gas will also promote the partial freezing out of the supercooled liquid due to the fact that the active production of gas within the liquid will put the liquid in such a stirring motion as to allow the molecules to adjust themselves to such relative positions as are required by the solid state. It is thus seen that the freezing out procedure is due in this case to a plurality of concurring circumstances. It is preferred to collect the escaping gas in order to again compress and cool it before again introducing it into the liquid.

What I claim is:

1. A method of partially freezing out a liquid, which consists in applying to the liquid a gas under pressure capable of lowering the freezing point of the liquid, cooling the liquid together with said added gas to lower its temperature to between the lower freezing point as obtained by the action of said gas and the original freezing point of the liquid, and releasing the pressure above the liquid to restore the freezing point of the liquid to approximately its original value.

2. A method of partially freezing out a liquid, which consists in applying to the liquid a substance adapted to exist in the gaseous state under pressure and capable of lowering the freezing point of the liquid, cooling the liquid together with said added substance to lower its temperature to between the lower freezing point as obtained by the action of said substance and the original freezing point of the liquid, and at least partially removing said substance by releasing the pressure above the liquid so as to restore the freezing point of the liquid to approximately its original value.

3. A method of partially freezing out a liquid, which consists in applying to the liquid a substance adapted to exist in the gaseous state under pressure and capable of lowering the freezing point of the liquid, cooling the liquid together with said substance to lower its temperature to between the lower freezing point as obtained by the effect of said substance and the original freezing point of the liquid, and releasing the pressure of the substance above the liquid to restore the freezing point of the liquid to approximately its original value.

4. A method of partially freezing out a liquid, comprising introducing a gaseous substance capable of lowering the freezing point of the liquid under pressure into the liquid while contained in a closed receptacle so as to produce a pressure above atmospheric therein and lower the freezing point of the liquid, cooling the liquid to below the freezing point of the liquid before introduction of the gas, and releasing the pressure of the gaseous substance to allow it to escape from the liquid to raise the freezing point of the liquid to above the temperature to which it has been cooled.

ERIK DAVID LINDBLOM.